(12) United States Patent
Shimizu et al.

(10) Patent No.: US 10,490,797 B2
(45) Date of Patent: Nov. 26, 2019

(54) ELECTRICITY STORAGE MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroshi Shimizu, Mie (JP); Hiroomi Hiramitsu, Mie (JP); Katsushi Miyazaki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 201 days.

(21) Appl. No.: 15/523,542

(22) PCT Filed: Nov. 6, 2015

(86) PCT No.: PCT/JP2015/081294
§ 371 (c)(1),
(2) Date: May 1, 2017

(87) PCT Pub. No.: WO2016/080213
PCT Pub. Date: May 26, 2016

(65) Prior Publication Data
US 2017/0263909 A1   Sep. 14, 2017

(30) Foreign Application Priority Data
Nov. 21, 2014  (JP) .................... 2014-236742

(51) Int. Cl.
*H01M 2/20* (2006.01)
*H01G 11/10* (2013.01)
(Continued)

(52) U.S. Cl.
CPC ................ *H01M 2/20* (2013.01); *H01G 9/08* (2013.01); *H01G 9/26* (2013.01); *H01G 11/10* (2013.01);
(Continued)

(58) Field of Classification Search
CPC ......... H01M 2/10; H01M 2/1077; H01M 2/20
(Continued)

(56) References Cited

U.S. PATENT DOCUMENTS

2012/0315522 A1   12/2012  Shin et al.

FOREIGN PATENT DOCUMENTS

| JP | 2009-059663 | 3/2009 |
|----|-------------|--------|
| JP | 2011-008955 | 1/2011 |

(Continued)

OTHER PUBLICATIONS

U.S. Appl. No. 15/523,984 to Hiroshi Shimizu filed May 3, 2017.
Search Report issued in International Bureau of WIPO Patent Application No. PCT/JP2015/081294, dated Jan. 12, 2016.

*Primary Examiner* — Bryan D. Ripa
*Assistant Examiner* — James M Erwin
(74) *Attorney, Agent, or Firm* — Greenblum & Bernstein, P.L.C.

(57) ABSTRACT

An electricity storage module includes: an electricity storage element group formed by aligning multiple electricity storage elements; detection wires that have end portions on one side connected to the electricity storage elements and detect the states of the electricity storage elements; a detection wire connector that is connected to other end portions on a side opposite to that of the end portions on the one side of the (Continued)

detection wires that are connected to the electricity storage elements; a device connector that electrically connects the detection wires and an external device by fitting into the detection wire connector; and a cover that covers a surface on a side on which the detection wires of the electricity storage element group are disposed. The cover is provided with a fixing hole that fixes the detection wire connector and the device connector in a state of being fit together.

8 Claims, 9 Drawing Sheets

(51) Int. Cl.
*H01G 11/14* (2013.01)
*H01M 2/10* (2006.01)
*H01G 9/08* (2006.01)
*H01G 9/26* (2006.01)
*H01M 10/48* (2006.01)

(52) U.S. Cl.
CPC .............. *H01G 11/14* (2013.01); *H01M 2/10* (2013.01); *H01M 2/1077* (2013.01); *H01M 2/206* (2013.01); *H01M 10/482* (2013.01); *H01M 2220/20* (2013.01)

(58) Field of Classification Search
USPC ......................................................... 429/163
See application file for complete search history.

(56) References Cited

FOREIGN PATENT DOCUMENTS

| | | |
|---|---|---|
| JP | 2013-109927 | 6/2013 |
| JP | 2013-525945 | 6/2013 |
| JP | 2013-152917 | 8/2013 |

ELECTRICITY STORAGE MODULE

TECHNICAL FIELD

The present invention relates to an electricity storage module.

BACKGROUND ART

An electricity storage module for motive power, which is to be mounted in an electric automobile or a hybrid vehicle for example, is commonly constituted by connecting many electricity storage elements in series via a connection member such as a busbar. In this type of electricity storage module, wires (detection wires) for detecting the states of the electricity storage elements are connected to the electricity storage elements in some cases (for example, see Patent Document 1).

CITATION LIST

Patent Documents

Patent Document 1: JP 2011-8955A

SUMMARY OF INVENTION

Technical Problem

In Patent Document 1, the detection wires, which have end portions on one side connected to holding pieces provided in a connection member, are passed through a wire passing recess provided in a connection unit, and are thereafter disposed in a wire accommodating groove, and the other end portions of the detection wires are electrically connected to a device (another device) such as a battery control unit (ECU).

Incidentally, a connector is used in some cases to electrically connect the detection wires and the other device. In such a case, a space for fitting together the connector connected to the detection wires and the connector connected to the other device and a space for routing the detection wires and the wires for the other device are needed, and thus there has been a problem in that the electricity storage module increases in size.

The present invention has been achieved based on the above-described circumstance, and it is an object thereof to provide an electricity storage module that can be reduced in size.

Solution to Problem

The present invention is an electricity storage module including: an electricity storage element group formed by aligning a plurality of electricity storage elements; detection wires that have end portions on one side connected to the electricity storage elements and are configured to detect states of the electricity storage elements; a detection wire connector that is connected to other end portions on a side opposite to that of the end portions on the one side of the detection wires that are connected to the electricity storage elements; a device connector that fits in the detection wire connector and electrically connects the detection wires and an external device; and a cover that covers a surface on a side on which the detection wires of the electricity storage element group are disposed, wherein the cover is provided with a connector fixing portion that fixes the detection wire connector and the device connector in a state of being fit together.

In the present invention, a detection wire connector to which the detection wires are connected and a device connector are fit together, whereby the detection wires and the other device are electrically connected, and a cover that covers a surface on a side on which the detection wires of the electricity storage element group are disposed is provided with a connector fixing portion that fixes the detection wire connector and the device connector in a state of being fit together.

Accordingly, with the present invention, it is sufficient that the detection wire connector and the device connector are fit together and thereafter fixed to the connector fixing portion provided on the cover, and therefore no space for fitting the connectors together in the electricity storage module is needed, and the wire for the other device (device wire) can also be disposed along the cover. As a result, with the present invention, it is possible to provide an electricity storage module that can be reduced in size.

The present invention may have the following configuration.

The cover may be provided with a wire fixing portion that fixes device wires guided from the device connector.

With this kind of configuration, the fit-together connectors are fixed to the cover by the connector fixing portion and the wire fixing portion, and therefore the load on the connector fixing portion can be reduced.

The electricity storage module may include a wire protection member that is attached to the cover and protects the detection wires.

With this kind of configuration, it is possible to protect the detection wires exposed to the outside of the cover from contact with another member or the like.

A fold-over guide portion on which the detection wires are folded over in a direction overlapping with the cover may be formed on the cover.

With this kind of configuration, the detection wires can be folded over along the fold-over guide portion, and it is possible to prevent damage to the wires such as wire external damage caused by the detection wires bending.

Advantageous Effects of Invention

With the present invention, it is possible to provide an electricity storage module that can be reduced in size.

DESCRIPTION OF EMBODIMENTS

Embodiment 1

Figure 1:
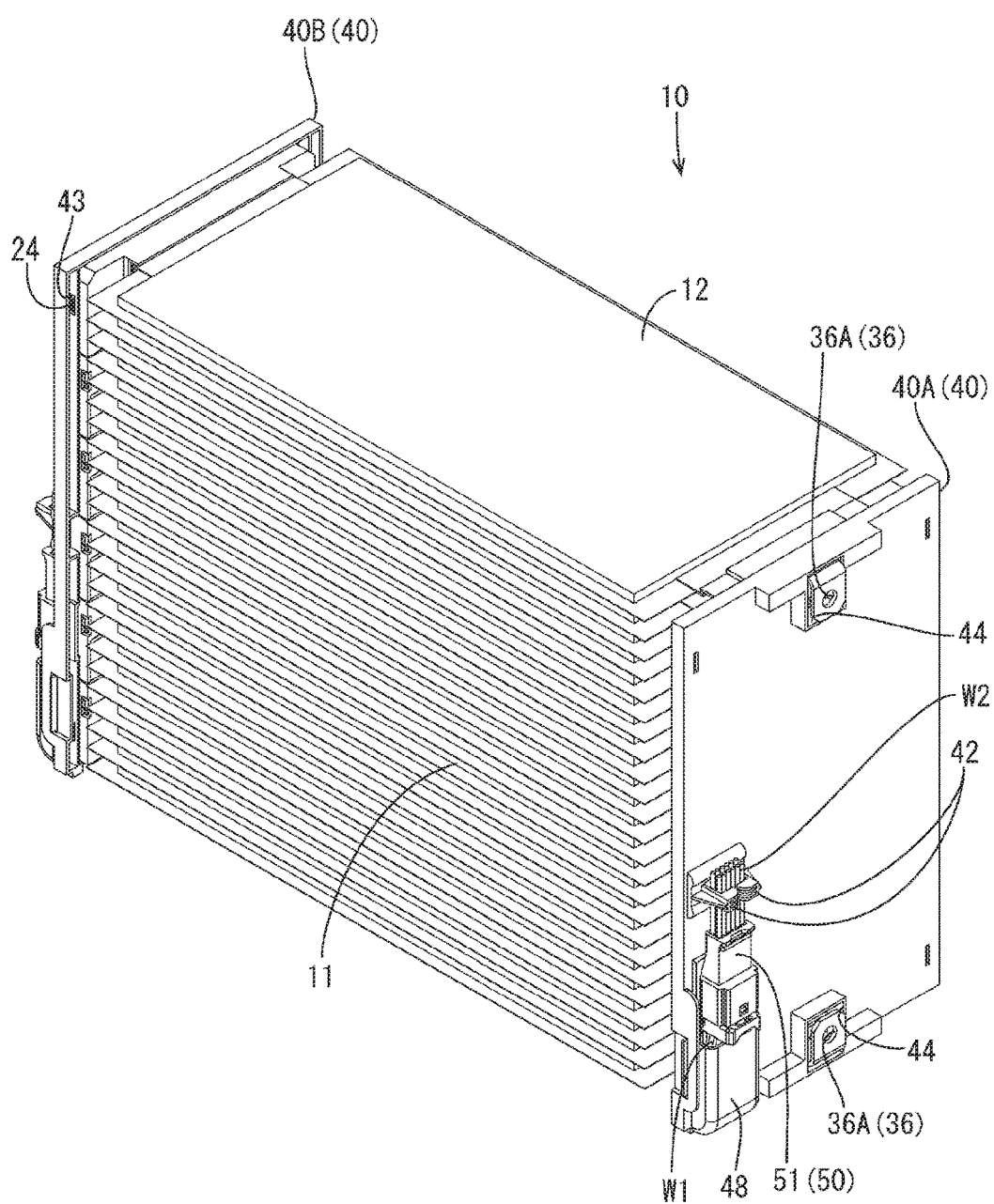
FIG. 1 is a perspective view showing an electricity storage module according to Embodiment 1 from a front surface side.
Figure 2:
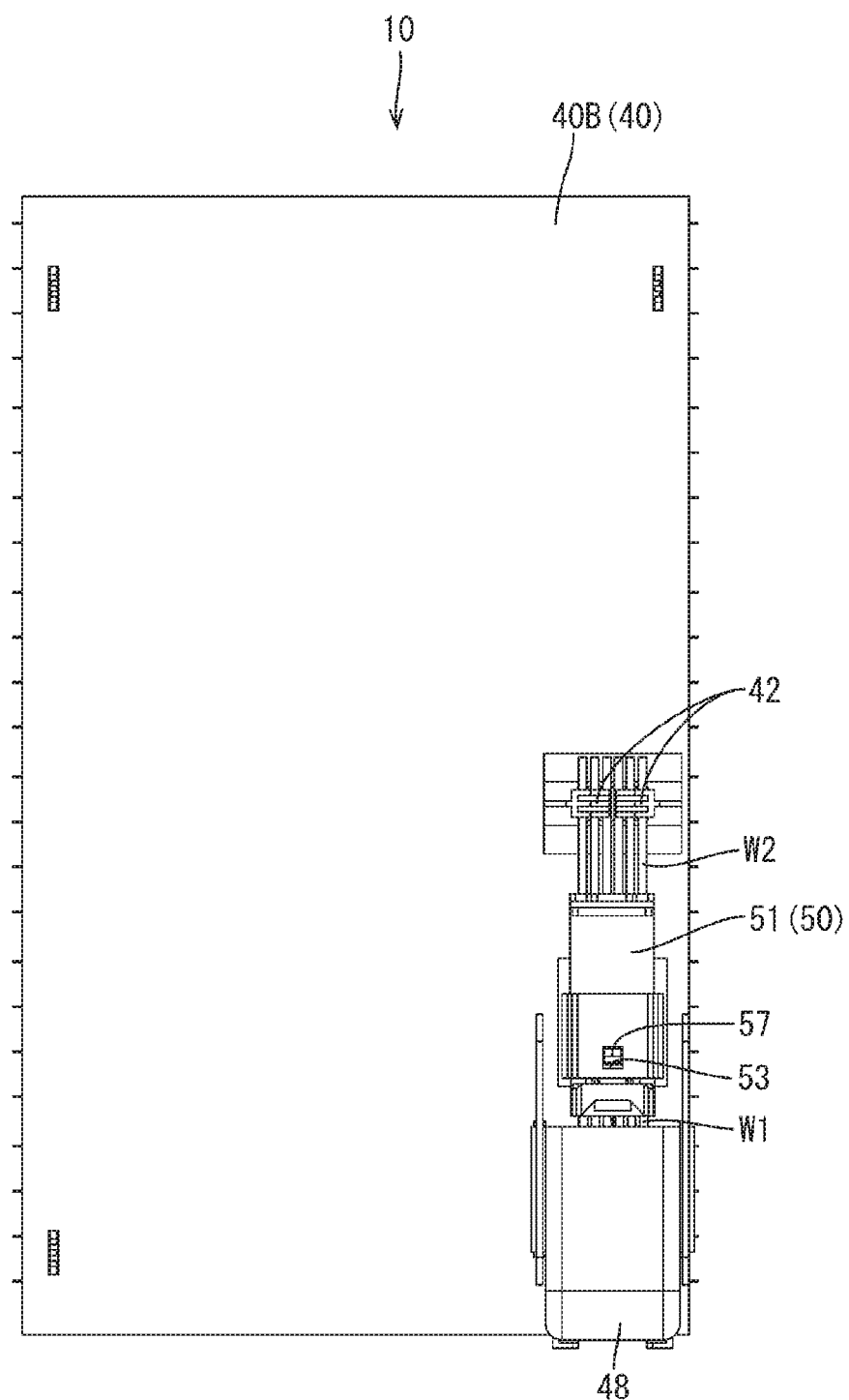
FIG. 2 is a rear view of an electricity storage module.

Embodiment 1 of the present invention will be described with reference to FIGS. 1 to 9. In the drawings, there are cases where only one of multiple members that are the same is denoted by a reference numeral and the other members that are the same are not denoted by reference numerals. In the following description, the upper side in FIG. 2 is up, the lower side is down, the right side in FIG. 1 is frontward (toward the front surface), and the left side is rearward (toward the rear surface).

The electricity storage module 10 according to the present embodiment includes: an electricity storage element group 11 formed by aligning multiple (in the present embodiment, 24) electricity storage elements 12 in a vertical direction; detection wires W1 that have end portions on one side connected to the electricity storage elements 12 and detect the states of the electricity storage elements 12; detection wire connectors 55 that are connected to the other end portions of the detection wires W1; device connectors 50 that fit into the detection wire connectors 55; and covers 40 that cover surfaces on sides on which the detection wires W1 of the electricity storage element group 11 are disposed.

Electricity Storage Elements 12

According to need, any electricity storage elements 12, such as secondary batteries, capacitors, and electric condensers, can be used as the electricity storage elements 12 constituting the electricity storage element group 11. Secondary batteries are used as the electricity storage elements 12 according to the present embodiment.

The electricity storage elements 12 each form an approximately rectangular shape in a view from above. The electricity storage elements 12 each include a container 14 that is formed by welding the side edges of a pair of laminate films that form an approximately rectangular shape, an electricity storage component (not shown) that is accommodated inside of the container 14, and lead terminals 13 of a cathode and an anode that are connected to the electricity storage component inside of the container 14 and are guided to the outside from the side edges of the container 14.

The electricity storage elements 12 are stacked such that the lead terminals 13 thereof with the same polarity are disposed vertically in groups of two, and are connected in parallel via the connection members 30. In the electricity storage element group 11, the frontward lead terminals 13 are aligned in the following order, starting from the top: anode, anode, cathode, cathode, anode, anode, . . . , and the rearward lead terminals 13 are aligned in the following order, starting from the top: cathode, cathode, anode, anode, cathode, cathode, . . . , although this is not shown in detail in the drawings.

The external connection busbar 36, which is electrically connected to an external device (not shown), is electrically connected to the anode lead terminals 13B of the electricity storage elements 12 disposed at the upper end portion and to the cathode lead terminals 13A of the electricity storage elements 12 disposed at the lower end portion. Examples of the external device include another electricity storage module 10 and an inverter.

Wire modules 20 are attached to surfaces on the sides to which the lead terminals 13 of the electricity storage element group 11 are guided (the frontward surface and the rearward surface in FIG. 1).

Wire Modules 20

The wire modules 20 are attached to the electricity storage element group 11 and are for electrically connecting the multiple electricity storage elements 12. The wire modules 20 include the connection members 30 that are connected to the lead terminals 13 of the electricity storage elements 12 and electrically connect the multiple electricity storage elements 12, and the holding members 21, which hold the connection members 30.

Holding Members 21

The holding members 21 that hold the connection members 30 are composed of an insulating material. In the present embodiment, multiple holding members 21 that are coupled together are attached to the electricity storage element group 11.

Figure 4:
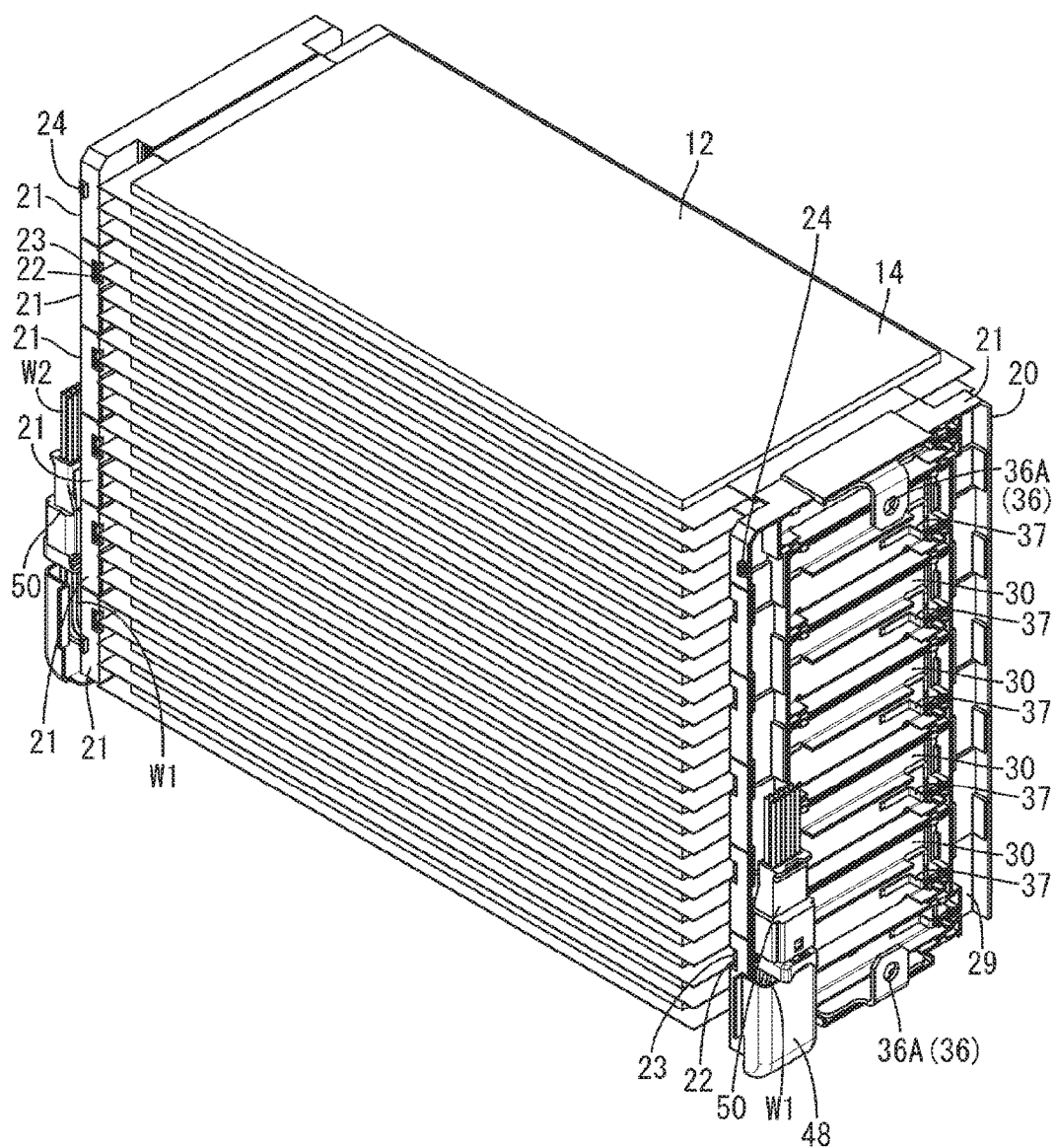
FIG. 4 is a perspective view showing a state in which holding members have been attached to an electricity storage element group.

Coupling protrusions 23 that are coupled by fitting into coupling holes 22 provided in the second holding member 21 from the top are provided on the holding member 21 disposed at the upper end in FIG. 4. The coupling holes 22 that receive the coupling protrusions 23 of the second holding member 21 from the bottom are provided in the holding member 21 disposed at the lower end in FIG. 4.

The holding members 21 other than the holding members 21 disposed at the upper and lower end portions are each provided with coupling holes 22 that receive coupling protrusions 23 of the holding member 21 located thereabove, and with coupling protrusions 23 that fit into coupling holes 22 of the holding member 21 located therebelow.

The cover attachment protrusions 24 that fit into the cover attachment holes 43 of the covers 40 are formed so as to protrude in an outward direction on the holding members 21 disposed at the upper end and the holding members 21 disposed at the lower end.

Figure 5:
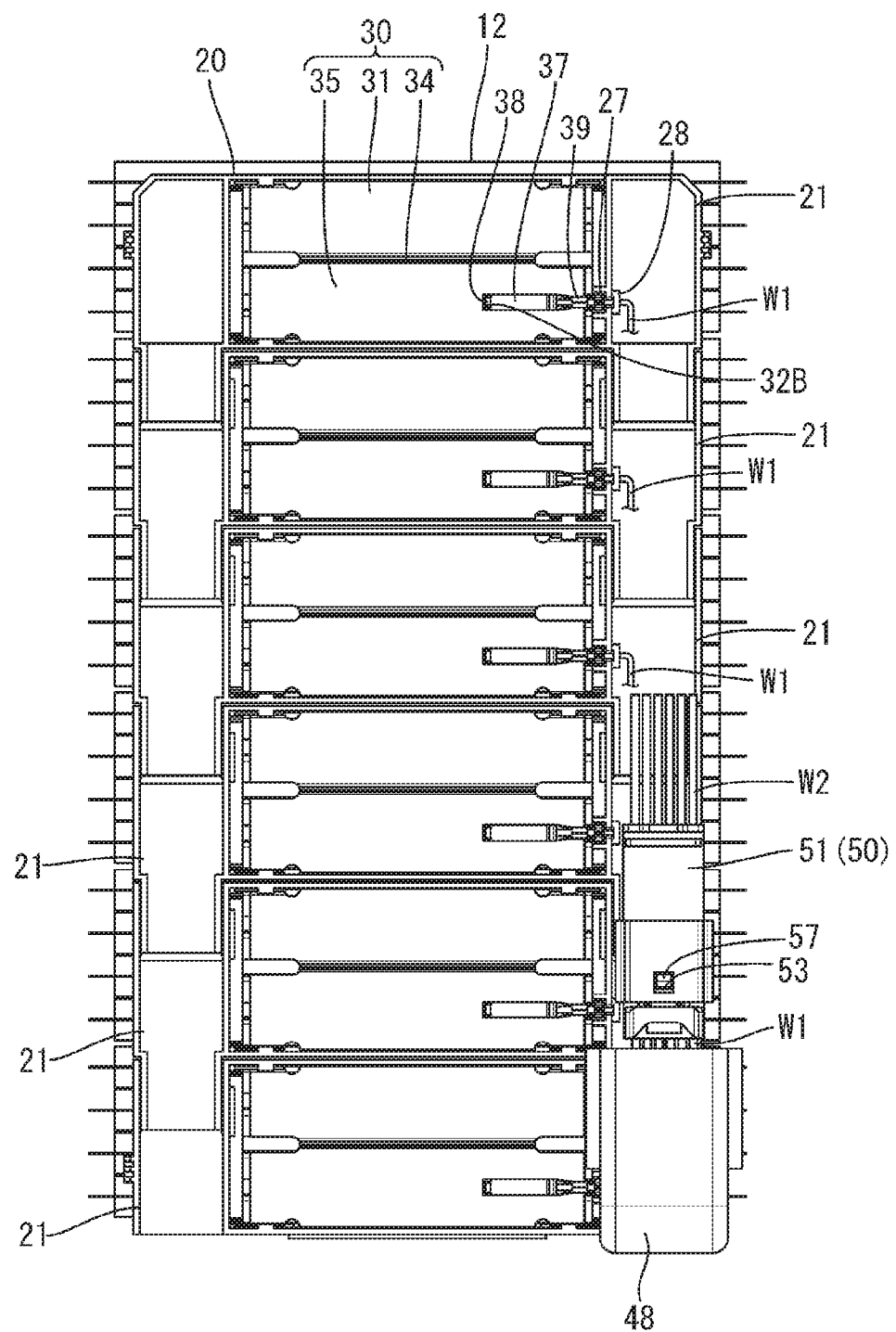
FIG. 5 is a rear view showing a state in which holding members have been attached to an electricity storage element group.

As shown in FIG. 5, each holding member 21 is provided with a terminal fixing portion 27 that fixes a barrel portion 39 of a detection terminal 37, a wire guiding portion 28 that guides a detection wire W1 connected to the detection terminal 37, and a wire routing portion 29 through which the detection wire W1 is routed.

The detection terminals 37 are for detecting the voltages and the like of the electricity storage elements 12, and are electrically connected to the lead terminals 13 of the electricity storage elements 12 via the connection members 30. The detection terminals 37 each include attachment claws 38 that are attached to a connection member 30, and a barrel portion 39 to which an end portion on one side of a detection wire W1 is connected.

Detection Wires W1

The detection wires W1 are formed by coating a conductor with a coating material made of insulating resin. The conductor of the detection wires W1 is composed of a metal material such as aluminum, an aluminum alloy, copper, or a copper alloy, for example, although this is not shown in detail in the drawings. The conductor is exposed at the end portions (an end portion on one side and another end portion) of each detection wire W1 due to the coating material being peeled off.

An end portion on one side of a detection wire W1 is electrically connected to an electricity storage element 12 via a detection terminal 37 and a connection member 30. The other end portion of the detection wire W1 (an example of another end portion on a side opposite to that of the end portion on the one side connected to the electricity storage element 12) is connected to a terminal (not shown) accommodated in the detection wire connector 55. The detection wire W1 is guided from the wire guiding portion 28 of the holding member 21 and is routed in the wire routing portion 29.

Detection Wire Connector 55

Figure 3:
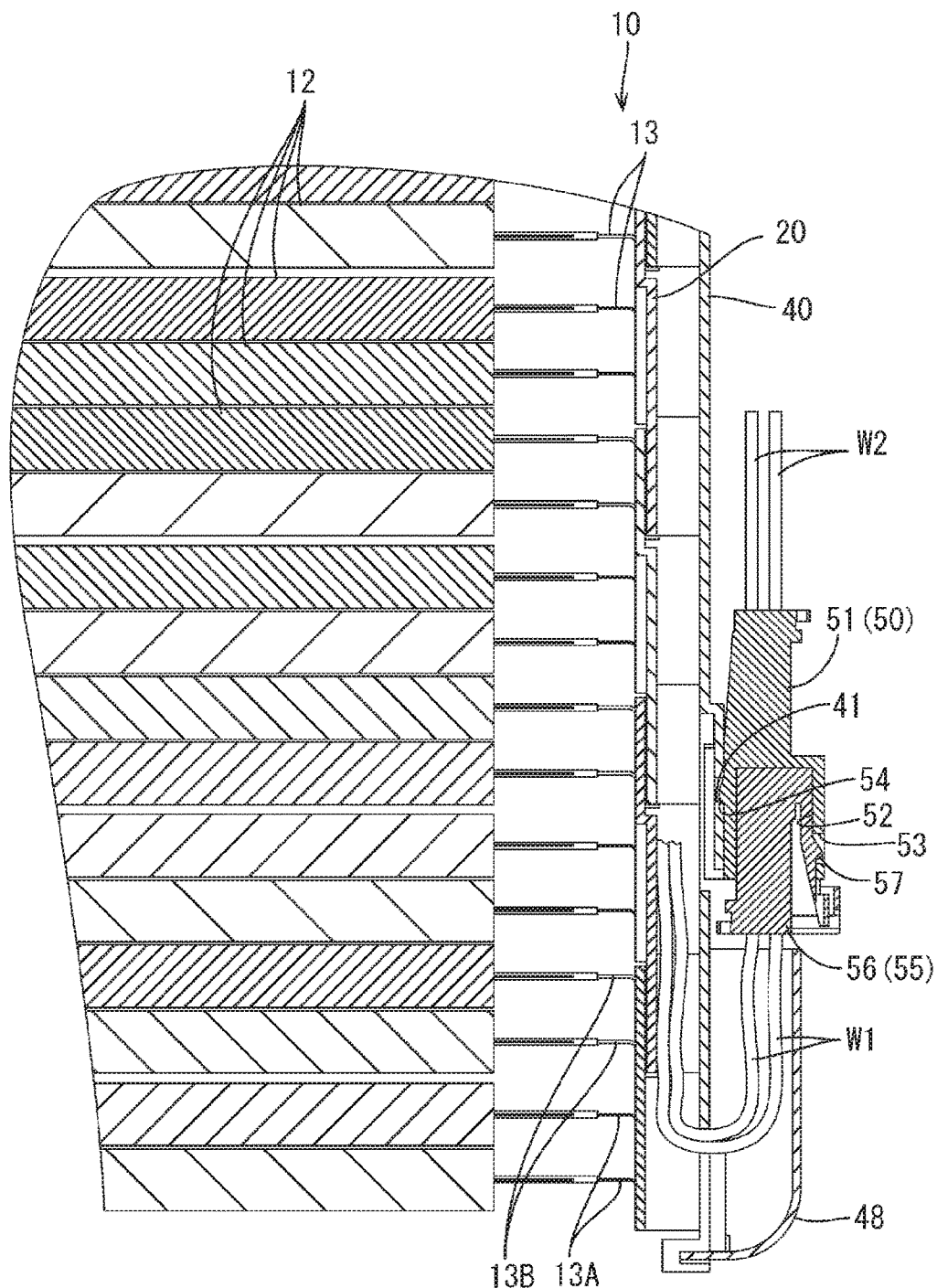
FIG. 3 is a partial cross-sectional view of an electricity storage module.

As shown in FIG. 3, the detection wire connector 55 has a housing 56 that accommodates a terminal connected to the detection wires W1. The housing 56 of the detection wire connector 55 is provided with an engaging protrusion 57 that engages with an engaging hole 53 provided in the housing 51 of the device connector 50.

Device Connector 50

The device connector 50 has the housing 51, which accommodates a terminal (not shown) connected to device wires W2 that are connected to another device such as a battery control unit (ECU). The housing 51 of the device connector 50 includes a fitting recess 52 into which the housing 56 of the detection wire connector 55 fits. The engaging hole 53 that receives and engages with the engaging projection 57 of the housing 56 of the detection wire connector 55 is formed in the fitting recess 52. When the fitting of the device connector 50 and the detection wire connector 55 is complete, the engaging projection 57 of the detection wire connector 55 is engaged with the engaging hole 53 of the device connector 50.

The surface of the housing 51 of the device connector 50 that is disposed on the cover 40 side when the detection wires W1 are folded over is provided with a fixing protrusion 54 that engages with a fixing hole 41 (an example of a connector fixing portion) formed in the cover 40.

Connection Member 30

As shown in FIG. 5, a connection member 30 to which lead terminals 13 of an electricity storage element 12 are connected is formed by joining a first metal portion 31, which is connected to cathode lead terminals 13A and is composed of the same metal material as that of the cathode lead terminals 13A, and a second metal portion 35, which is connected to anode lead terminals 13B and is composed of the same metal material as that of the anode lead terminals 13B. The first metal portion 31 and the second metal portion 35 are joined using a known method, such as cold pressure welding or welding, for example. In the present embodiment, the first metal portion 31 is composed of a metal plate material made of aluminum or an aluminum alloy, and the second metal portion 35 is composed of a metal plate material made of copper or a copper alloy.

In the connection member 30, the first metal portion 31 and the second metal portion 35 each have a terminal joining portion 32 that is joined to the lead terminals 13, and a member joining portion 34 at which the first metal portion 31 and the second metal portion 35 are joined. A rectangle-shaped terminal attachment hole 32B to which the detection terminal 37 is attached is formed in a terminal joining portion 32 of the connection member 30. Also, the four corners of the connection member 30 are each provided with a fixed portion 33 that is fixed to a holding member 21, although this is not shown in detail in the drawings.

In front of the electricity storage element group 11, the two anode lead terminals 13B from the top are joined to the terminal joining portion 32 of an end portion connection member 30A, which is composed of only the second metal portion 35, and the two cathode lead terminals 13A from the bottom are joined to the terminal joining portion 32 of an end portion connection member 30A, which is composed of only the second metal portion 35. The lead terminals 13 other than these are joined in groups of two to the terminal joining portions 32 of the connection members 30, which are each formed by joining a first metal portion 31 and a second metal portion 35.

Examples of the method for welding the lead terminals 13 and the terminal joining portions 32 of the connection members 30 and the method for welding the lead terminals 13 and the external connection busbar 36 include laser welding and ultrasonic welding.

Covers 40

As shown in FIG. 1, the electricity storage module 10 includes the covers 40, which are made of insulating resin and are disposed on the surfaces (front surface and back surface) on the sides of the electricity storage element group 11 on which the detection wires W1 are disposed.

Figure 6:
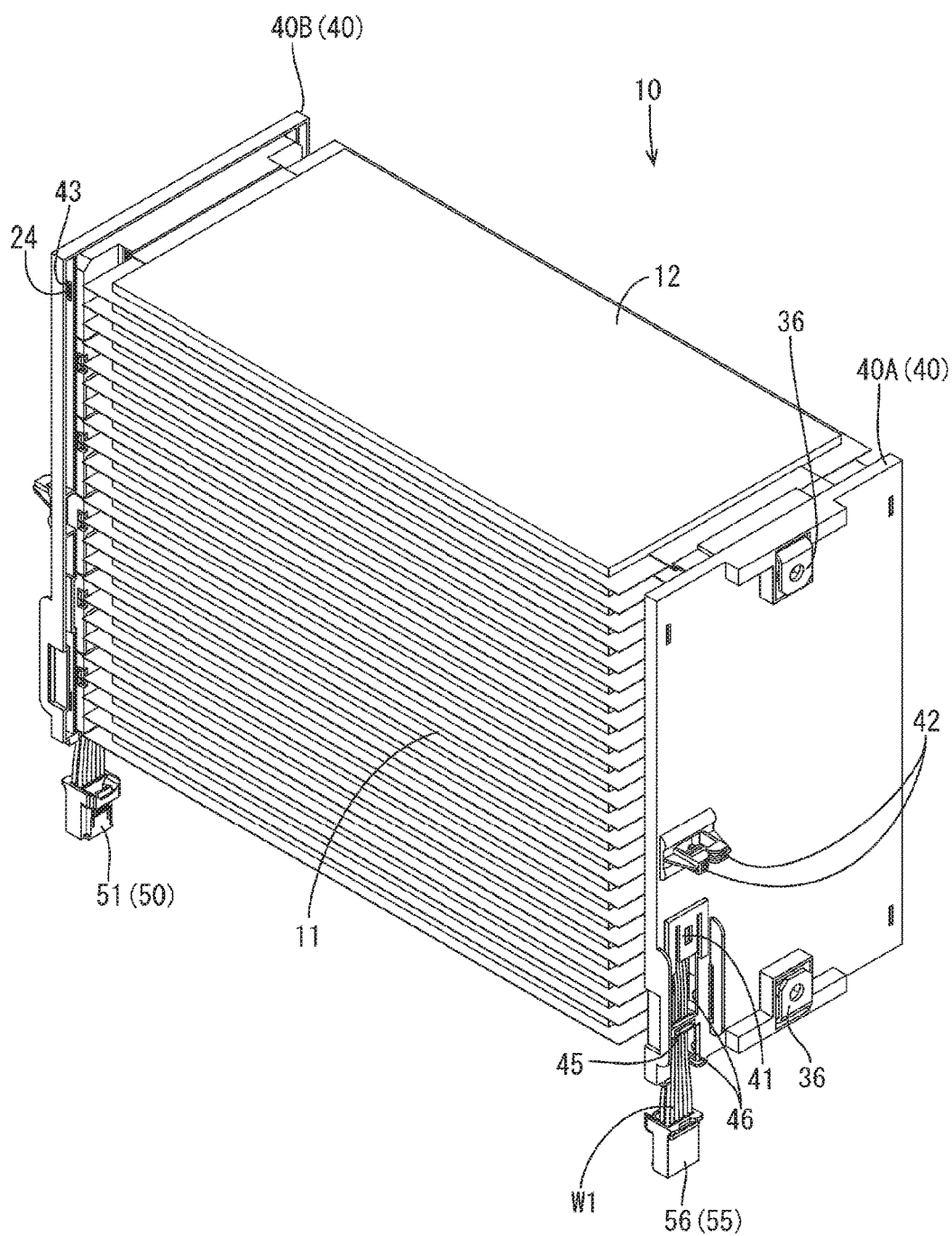
FIG. 6 is a perspective view showing, from a front surface side, an electricity storage module prior to folding over detection wires.
Figure 7:
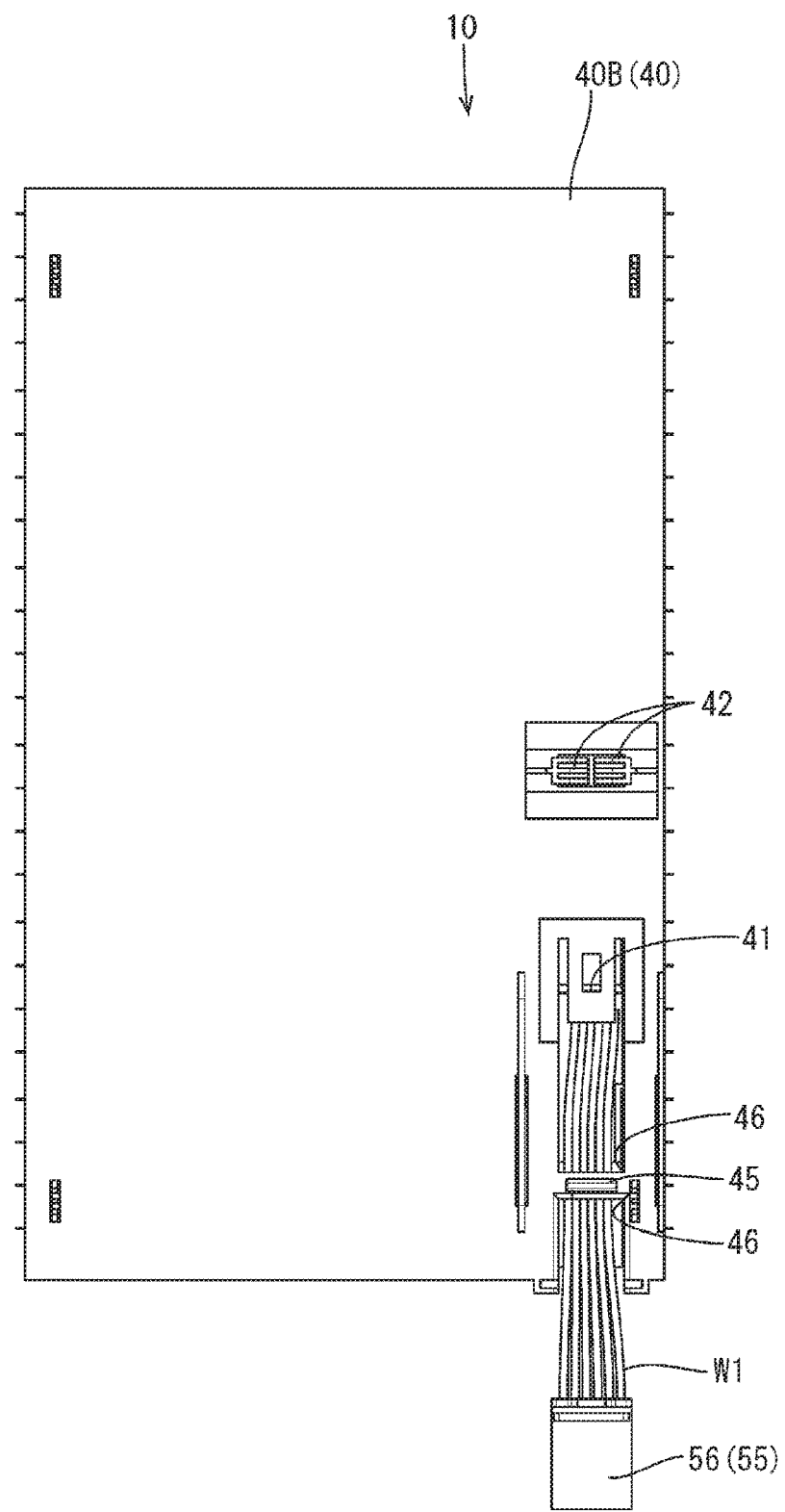
FIG. 7 is a rear view of an electricity storage module prior to folding over detection wires.

As shown in FIGS. 6 and 7, the front surface side cover 40A of the electricity storage element group 11 and the rear surface side cover 40B are each provided with a fixing hole 41 (an example of a connector fixing portion) that fixes a detection wire connector 55 and a device connector 50 in a state of being fit together. The fixing protrusion 54 formed in the housing 51 of the device connector 50 engages with the fixing hole 41 formed in the cover 40. Due to the fixing protrusion 54 engaging with the fixing hole 41, the detection wire connector 55 and the device connector 50 are fixed in a state of being fit together.

Also, the front surface side cover 40A and the rear surface side cover 40B are each provided with a pair of wire fixing pieces 42 (examples of wire fixing portions) that fix the device wires W2 that are guided from the housing 51 of the device connector 50.

The lower end portion of the front surface side cover 40A and the lower end portion of the rear surface side cover 40B are each provided with a fold-over guide portion 45 on which the detection wires W1 are folded over in the upward direction (direction of overlapping with the covers 40). Square-shaped cut-out portions 46 are formed above and below the fold-over guide portion 45. Since the detection wires W1 are disposed in an exposed state on the cut-out portion 46 above the fold-over guide portion 45 and the fold-over guide portion 45, a wire protection member 48 that protects the detection wires W1 is attached at this portion. The detection wires W1 are covered due to the wire protection member 48 being fit into the cut-out portion 46.

The cover 40A on the front surface side and the cover 40B on the rear surface side are each further provided with cover attachment holes 43 that receive cover attachment protrusions 24 of a holding member 21 (see FIG. 1).

The upper end and the lower end of the front surface side cover 40A are each provided with a busbar guiding hole 44 through which an external connection busbar 36 is guided. The external connection busbar 36 is composed of a conductive metal material such as copper or a copper alloy, or aluminum or an aluminum alloy, and connection holes 36A electrically connected to the external device are provided so as to penetrate therethrough.

Method for Assembling the Electricity Storage Module 10

The end portions of the lead terminals 13 of the 24 electricity storage elements 12 are bent approximately orthogonally downward, and are stacked such that two lead terminals 13 that are vertically adjacent have the same polarity. The barrel portions 39 of the detection terminals 37 are pressure-welded to the end portions on one side of the detection wires W1. The device connectors 50 are prepared.

Eleven connection members 30 and two end portion connection members 30A are prepared and are fixed by being attached to predetermined holding members 21. The detection terminals 37 are fixed when multiple holding members 21 are coupled so as to form a plate shape, the attachment claws 38 of the detection terminals 37 are inserted into the terminal attachment holes 32B of the connection members 30, which are fixed to the holding members 21, the barrel portions 39 of the detection terminals 37 are fixed to the terminal fixing portions 27 of the holding members 21, and the detection wires W1 are guided from the wire guiding portions 28.

Next, the detection wires W1 connected to the detection terminals 37 are routed in the wire routing portions 29 of the holding members 21, the terminals of the detection wire connectors 55 are connected to the other end portions of the detection wires W1 and accommodated in the housings 56, and thereby the wire modules 20 attached to the front and rear of the electricity storage element group 11 are produced.

Next, the wire modules 20 are disposed frontward and rearward of the electricity storage element group 11, and the lead terminals 13 and the terminal joining portions 32 of the connection members 30 are joined using a welding method such as laser welding. At this time, the external connection busbar 36 is also connected to the wire module 20 attached to the front.

Next, as shown in FIGS. 6 and 7, when the front surface side cover 40A and the rear surface side cover 40B are attached, the detection wires W1 routed in the wire routing portions 29 of the holding members 21 are disposed in an exposed state in the cut-out portions 46 formed above and below the fold-over guide portions 45.

Next, the detection wire connectors 55 and the device connectors 50 are fit together, and the detection wires W1 below the covers 40 are folded over at the fold-over guide portions 45. When the fitting of the detection wire connectors 55 and the device connectors 50 is complete, the engaging protrusions 57 of the detection wire connectors 55 are retained by being engaged with the engaging holes 53 of the device connectors 50.

Figure 8:
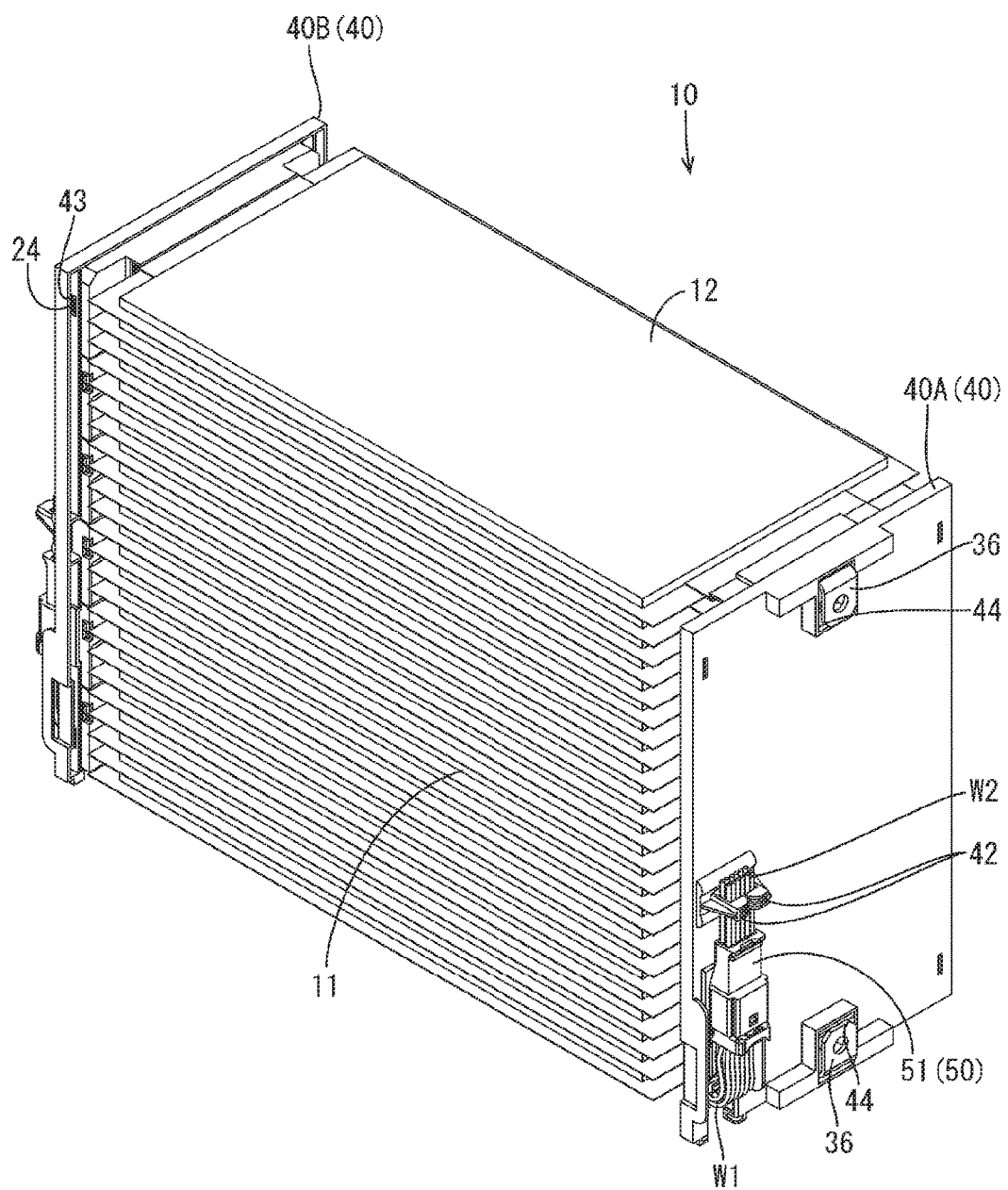
FIG. 8 is a perspective view showing a state in which a detection wire connector and a device connector have been fit together and fixed to a cover.
Figure 9:
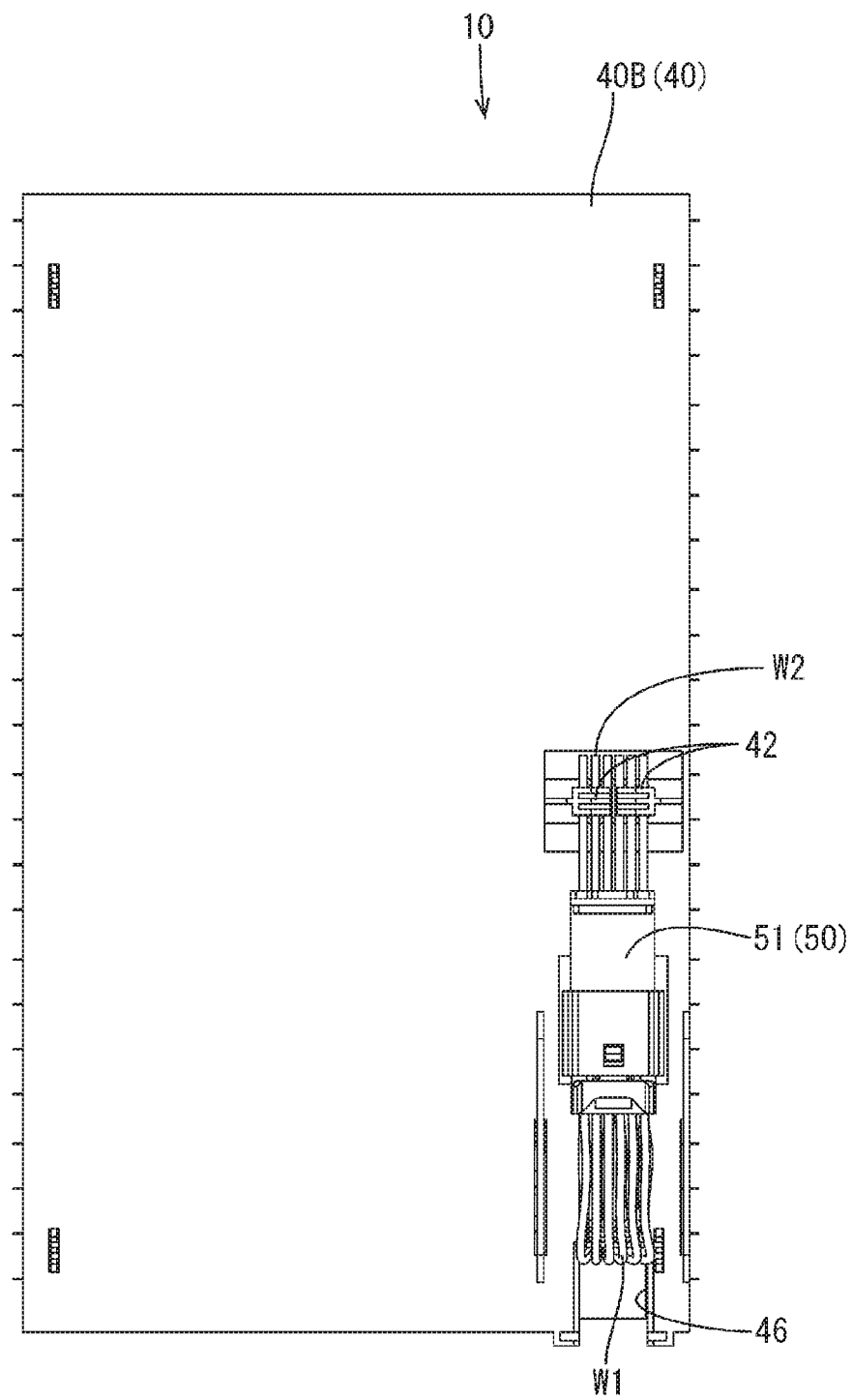
FIG. 9 is a rear view showing a state in which a detection wire connector and a device connector have been fit together and fixed to a cover.

Next, the fixing protrusions 54 of the device connectors 50 in the state of being fit together with the detection wire connectors 55 are fixed by being fit into the fixing holes 41 provided in the covers 40, and the device wires W2 guided from the housings 51 of the device connectors 50 are fixed by the pairs of wire fixing pieces 42. Upon doing so, as shown in FIGS. 8 and 9, the fit-together connectors 50 and 55 are fixed to the covers 40 by the fixing holes 41 and the wire fixing pieces 42. Next, when the wire protection members 48 are fit into the cut-out portions 46 formed in the covers 40 and cover the detection wires W1, the electricity storage module 10 shown in FIG. 1 is obtained.

Effects of the Present Embodiment

Next, effects of the present embodiment will be described.

In the present embodiment, the detection wire connector 55 and the device connector 50 are fit together so that the detection wires W1 and the other device are electrically connected, and the cover 40 that covers the surface on the side on which the detection wires W1 of the electricity storage element group 11 are disposed is provided with the fixing hole 41 (connector fixing portions) that fixes the detection wire connector 55 and the device connector 50 in a state of being fit together. Accordingly, with the present embodiment, it is sufficient that the detection wire connector 55 and the device connector 50 are put in a state of being fit together and are thereafter fixed to the fixing hole 41 provided on the cover 40, and therefore no space for fitting together the connectors in the electricity storage module 10 is needed, and the device wires W2 can be disposed along the cover 40. As a result, with the present embodiment, it is possible to provide an electricity storage module 10 that can be reduced in size.

Also, since the cover 40 is provided with the wire fixing pieces 42 that fix the device wires W2 guided from the device connector 50 in the present embodiment, the fit-together connectors 50 and 55 are fixed to the cover 40 by the fixing hole 41 and the wire fixing pieces 42, and therefore the load on the fixing hole 41 can be reduced.

Also, with the present embodiment, the electricity storage module 10 includes the wire protection member 48, which is attached to the cover 40 to protect the detection wires W1, and therefore the detection wires W1 that are exposed to the outside of the cover 40 can be protected from contact with another member or the like.

Furthermore, with the present embodiment, the fold-over guide portion 45 at which the detection wires W1 are folded over in the direction of overlapping with the cover 40 is formed on the cover 40, and therefore the detection wires W1 can easily be folded over along the fold-over guide portion 45, and it is possible to prevent damage to the wires, such as wire external damage caused by the detection wires W1 bending.

Other Embodiments

The technique disclosed in the present specification is not limited to the embodiment described by means of the disclosure above and the drawings, and may be an embodiment such as those described hereinafter, for example.

(1) In the above-described embodiment, a cover 40 provided with wire fixing pieces 42 that fix the device wires W2 guided from the device connector 50 was indicated, but it is also possible to use a cover that does not include a wire fixing portion.

(2) In the above-described embodiment, it was indicated that a wire protection member 48 that is attached to the cover 40 to protect the detection wires W1 is included, but it is also possible to use a configuration in which no wire protection member is included.

(3) In the above-described embodiment, a cover 40 on which was formed a fold-over guide portion 45 on which the detection wires W1 are folded over in a direction of overlapping with the cover 40 was indicated, but it is also possible to use a cover on which no fold-over guide portion is formed.

(4) In the above-described embodiment, an electricity storage element group 11 composed of 24 electricity storage elements 12 was shown, but the number of electricity storage elements constituting the electricity storage element group may be less than 24 or more than 24.

(5) In the above-described embodiments, it was indicated that the electricity storage elements 12 are connected in parallel in groups of two, but all of the electricity storage elements may be connected in series, and the electricity storage elements may be connected in parallel in groups of three or more.

(6) In the above-described embodiment, an example was given in which a secondary battery was used as the electricity storage element 12, but a capacitor, an electric condenser, or the like may be used as the electricity storage element.

LIST OF REFERENCE NUMERALS

10: Electricity storage module
11: Electricity storage element group
12: Electricity storage element
37: Detection terminal 40: Cover
40A: Front surface side cover
40B: Rear surface side cover
41: Fixing hole (connector fixing portion)
42: Wire fixing piece (wire fixing portion)
45: Fold-over guide portion
46: Cut-out portion
48: Wire protection member
50: Device connector
51: Housing
52: Fitting recess
53: Engaging hole
54: Fixing protrusion
55: Detection wire connector
56: Housing
57: Engaging protrusion
W1: Detection wire
W2: Device wire

The invention claimed is:

1. An electricity storage module comprising:
an electricity storage element group including a plurality of aligned electricity storage elements;
detection wires that have end portions on one side connected to the electricity storage elements and are configured to detect states of the electricity storage elements;
a detection wire connector that is connected to other end portions on a side opposite to that of the end portions on the one side of the detection wires that are connected to the electricity storage elements;
a device connector that fits together with the detection wire connector and electrically connects the detection wires and an external device; and
a cover provided on a side of the electricity storage element group on which the detection wires of the electricity storage element group are disposed and that covers the electricity storage elements,
a connector fixing portion provided on the cover that fixes the detection wire connector and the device connector in a fit together condition, the connector fixing portion comprising a fixing hole, and
a fixing protrusion provided on the device connector and engaged in the fixing hole.

2. The electricity storage module according to claim 1, wherein the cover is provided with a wire fixing portion that fixes device wires guided from the device connector.

3. The electricity storage module according to claim 1, comprising a wire protection member that is attached to the cover and protects the detection wires.

4. The electricity storage module according to claim 1, wherein a fold-over guide portion on which the detection wires are folded over in a direction overlapping with the cover is provided on the cover.

5. The electricity storage module according to claim 2, comprising a wire protection member that is attached to the cover and protects the detection wires.

6. The electricity storage module according to claim 2, wherein a fold-over guide portion on which the detection wires are folded over in a direction overlapping with the cover is provided on the cover.

7. The electricity storage module according to claim 3, wherein a fold-over guide portion on which the detection wires are folded over in a direction overlapping with the cover is provided on the cover.

8. The electricity storage module according to claim 5, wherein a fold-over guide portion on which the detection wires are folded over in a direction overlapping with the cover is provided on the cover.

* * * * *